United States Patent
Rosenbaum et al.

(10) Patent No.: US 9,411,888 B2
(45) Date of Patent: *Aug. 9, 2016

(54) HOSTED VIDEO DISCOVERY AND PUBLISHING PLATFORM

(75) Inventors: Steven J. Rosenbaum, New York, NY (US); Matthew Simon Ryan Cavalletto, New York, NY (US)

(73) Assignee: Magnify Networks, Inc., New York, NY (US)

( * ) Notice: Subject to any disclaimer, the term of this patent is extended or adjusted under 35 U.S.C. 154(b) by 1105 days.

This patent is subject to a terminal disclaimer.

(21) Appl. No.: 13/371,530

(22) Filed: Feb. 13, 2012

(65) Prior Publication Data
US 2012/0144003 A1 Jun. 7, 2012

Related U.S. Application Data

(63) Continuation of application No. 11/773,487, filed on Jul. 5, 2007, now Pat. No. 8,117,545.

(60) Provisional application No. 60/818,369, filed on Jul. 5, 2006.

(51) Int. Cl.
G06F 3/00 (2006.01)
G06F 17/30 (2006.01)

(52) U.S. Cl.
CPC ...... *G06F 17/30864* (2013.01); *G06F 17/3082* (2013.01)

(58) Field of Classification Search
CPC .................................. G06F 17/30864
USPC .................. 715/719, 721, 731, 733, 738, 743
See application file for complete search history.

(56) References Cited

U.S. PATENT DOCUMENTS

2006/0224964 A1* 10/2006 Schwartz .......... G06F 17/30056 715/730
2008/0010585 A1* 1/2008 Schneider ...... H04N 21/234318 715/201

* cited by examiner

*Primary Examiner* — Andrey Belousov
(74) *Attorney, Agent, or Firm* — David H. Judson

(57) ABSTRACT

A hosted system provides any Internet user with the ability to quickly set up and customize a video channel, preferably as a web page or site that can be reached from any Internet-accessible device having a browser. The solution includes tools for use by channel site creators to customize look, feel, and page design. A particular web page or site may be associated with a given subject. A page or site that has such an association is sometimes referred to as "subject-specific." Once a subject-specific channel is created, a site administrator or individual visitors can search and choose to bring those search results into the channel architecture. The system also enables a multiplatform search, and search results may be automatically populated into the channel content. The system enables the characterization of the material returned, preferably according to a user-generated taxonomy.

11 Claims, 26 Drawing Sheets

FIG. 4

Create a channel   ① Identity >>   ② Content >>   ③ Design >>   You're done!

Your email address: [_____]
This will be your administrator login. Don't worry, we'll keep it private.

Choose a password: [_____]
At least six characters required, case-sensitive.

Name your channel: [_____]
You can always change this later.

Link to an existing site: [_____]
Optional. If you have another web site, enter its address here.

Service Terms: ☐ I have read and agree to the terms of service.

[Next >>]

FIG. 5

Create a channel   ① Identity >>   ② Content >>   ③ Design >> You're done!

Channel description: [                    ]

Channel keywords: [                    ]

Content category: [Select one: ▼]

User submissions: [Yes, allow other people to post videos to this channel. ▼]

Public or Private?
- ● Public Channel
  Published in our channel guide.
- ○ Unlisted Channel
  Open access but not visible in channel guide.
- ○ Private Channel
  Visible to friends, family, and approved users.

Channel listing: [Guide Button Shape 150 x 45 Pixels]

Select a logo or image to be your guide button. Help me!

[          ] [Browse...]

[ Next >> ]

FIG. 8B http://guitars.magnify.net

Guitars

☑ Signed in as dhjhome   ☐ Sign Out   ○ FAQ   ○ Return to Public Site

| Account | Options | Design | Content | Advanced |

Administration for Guitars

Customize your site's options and behavior.

You can adjust the site name and the text shown on the site, and control the submission and review policies for content posted to your site.

Guitars
Site Name and Web Address
Site Name:          Guitars
Web Address:        guitars.magnify.net (✓)
Link to Other Site: none
▲ Change site name or web address
Site Description
Tag Line:           Guitars
Site's Focus:
Site Greeting:
Site Keywords:      guitar, fender, gibson, taylor, stratocaster
▲ Change description text
Community Messages and Blogging
Enable Discussion:     No
Discussion Title:      Community Messages
Allow Users to Post:   No
Allow Users to Reply:  No
▲ Change message options
Submission and Peer Review
Publish after:      3 reviews
Cutoff score:       5.00 or higher required for approval
▲ Adjust Submission and Review Policies
▲ Change Review Terms
Formats and Playback Options
Posting Types:      Video
Off-site Videos:    Play off-site videos in an embedded player
▲ Choose Post Formats and Playback Options

Guitars http://guitars.magnify.net

Administration for Guitars

Quickly add new videos to your site with this form.

You can also create and manage automatic searches which will run daily or weekly.

To ban videos with certain words from all search results on your site, uses the Excluded Terms tool. For more information on search options, consult our meta-search FAQ.

☑ Signed in as dhjhome ☐ Sign Out ○FAQ ○Return to Public Site

— Account — — Options — — Design — — Content — — Advanced —

Search and Submit Multiple Videos

Find Existing Clips
Enter search criteria to find existing video clips.

Keywords: [Fender stratocaster] [Search]

Search Tip: Separate search terms with spaces, include phrases inside quotes, and use a minus sign to omit words or phrases. [See FAQ for more >]

Search: ☑ All Sources
☑ Yahoo Video ☑ YouTube ☑ Google Video ☑ Revver ☑ Metacafe
☑ Dailymotion ☑ Blip.tv And then: ● Show me the search results and let me choose the videos for my site.
○ Automatically post the first [5 ▼] videos discovered from each source.

☐ Repeat this auto-post process every [7 ▼] days.

Group these results with extra tags: [____]

Scheduled Automatic Searches
Find new content for your site.
You can use the form above to schedule a repeating auto-post process.

Upload from your computer
You can upload video files directly to Magnify.net:

[Browse....] [Upload]

Exclude Certain Terms
You can block videos with certain words in their titles or descriptions from appearing in the search results.
Excluded Terms: –none–
▶ Edit Excluded Terms

FIG. 17

FIG. 19 http://guitars.magnify.net

Guitars

☑ Signed in as dhjhome   ☐ Sign Out   ○ FAQ   ○ Enter Site Admin

Video | Playlists | Search | Submit | Members

The Guitars Channel

Rate This Video

Help determine if this video is good for this community.

Fits this site? — Good Fit
Length: — Long
Entertaining? — No
Informative? — Sort of
Appropriate For: — Adults
Would Recommend? — Not Really

HOSTED VIDEO DISCOVERY AND PUBLISHING PLATFORM

This application is a continuation of Ser. No. 11/773,487, filed Jul. 5, 2007, which application was based on and claimed priority to Ser. No. 60/818,369, filed Jul. 5, 2006.

COPYRIGHT STATEMENT

This application includes subject matter that is protected by copyright. All rights are reserved.

BACKGROUND OF THE INVENTION

1. Technical Field

The present invention relates generally to online content discovery and publishing.

2. Background of the Related Art

Currently, there are large collections of video clips available on web sites across the publicly-routed Internet. Users of Internet-accessible machines can navigate to such web sites and view those clips, using a web browser or browser plug-in. Also, Internet search engines provide end users with the capability of searching for video clips from these sites. It is also known in the prior art for web site hosting entities to provide tools and templates to facilitate the creation of web pages or sites, which pages or sites are then hosted by the entities for a recurring fee. These hosted sites also may include search capabilities.

BRIEF SUMMARY

Generally, the system provides any Internet user with the ability to quickly set up and customize a video channel, preferably as a web page or site that can be reached from any Internet-accessible device having a web browser. The solution includes tools for use by channel site creators to customize the look, feel, and page design. A particular web page or site may be associated with a given subject. As used herein, a page or site that has such an association is sometimes referred to as "subject-specific." Although not meant to be limiting, once a subject-specific channel is created, a site administrator or individual visitors can search across the web and choose to bring those search results into the channel architecture. The system also enables a multiplatform search as an integrated part of a library build; if desired, search results are automatically populated into the channel content. The system also enables the characterization of the material returned, preferably according to a user-generated taxonomy. In one embodiment, the taxonomy may be developed from a collaborative filtering review that extends beyond the search characteristics. The system thus facilitate the process of discovery and organization within a vertical channel of online video content, drawing in videos from all over the Internet, and collecting them in new topical contexts, where they can be annotated by members of a social network, online community, or other group with a shared interest.

Preferably, the system provides links to or embedded players for content that is hosted on multiple third-party web sites. Web browsers then display these independently-hosted videos in the context of the system's web pages. It is not required that the system copy, host, or serve those embedded videos, which typically are delivered by third parties under their own terms and licenses.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 4 illustrates a registration page by which a user can begin the process of creating a video channel;

FIG. 5 illustrates a content definition page by which a user can identify the channel content;

Figure 9B:
Figure 10:
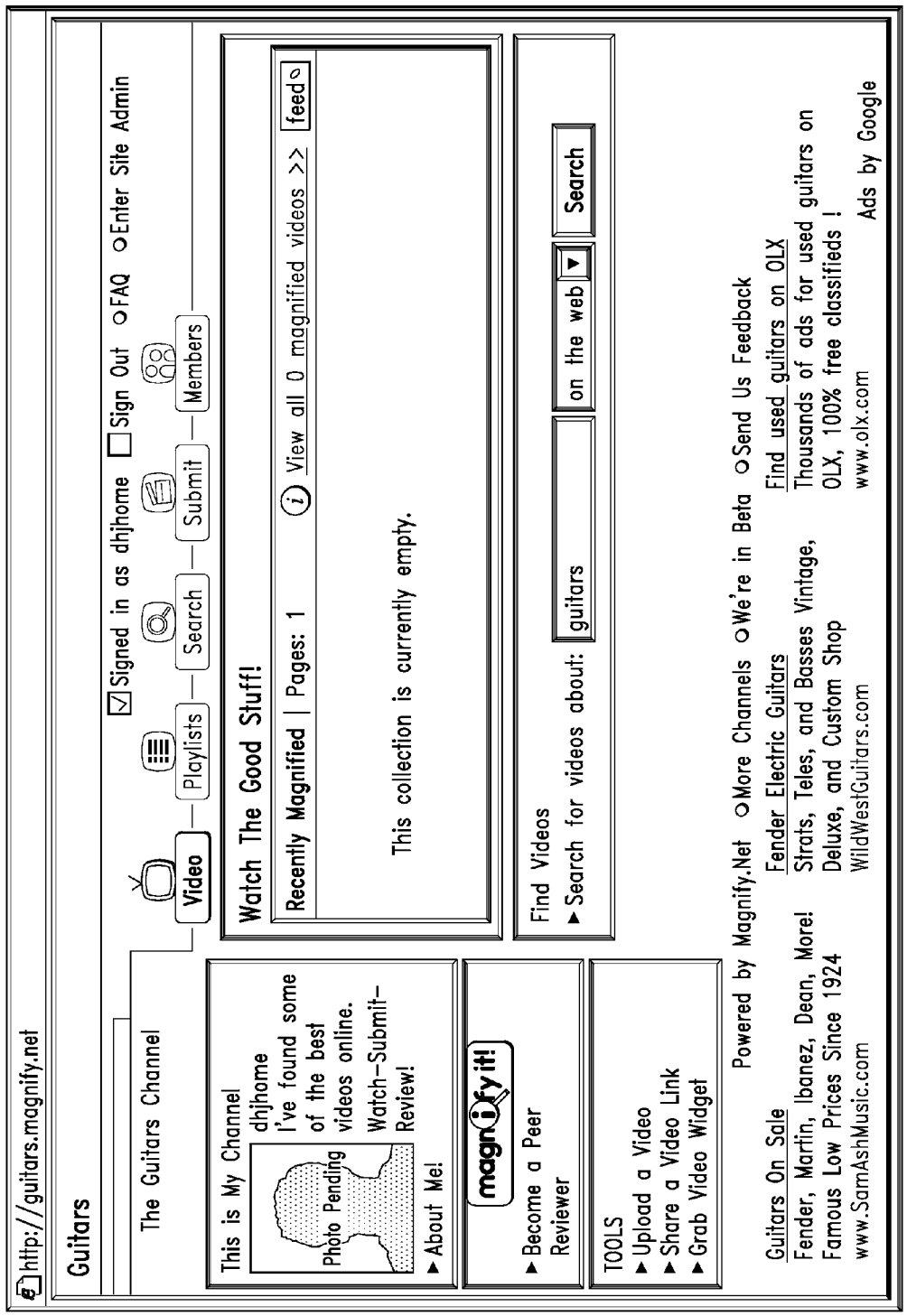
Figure 11:
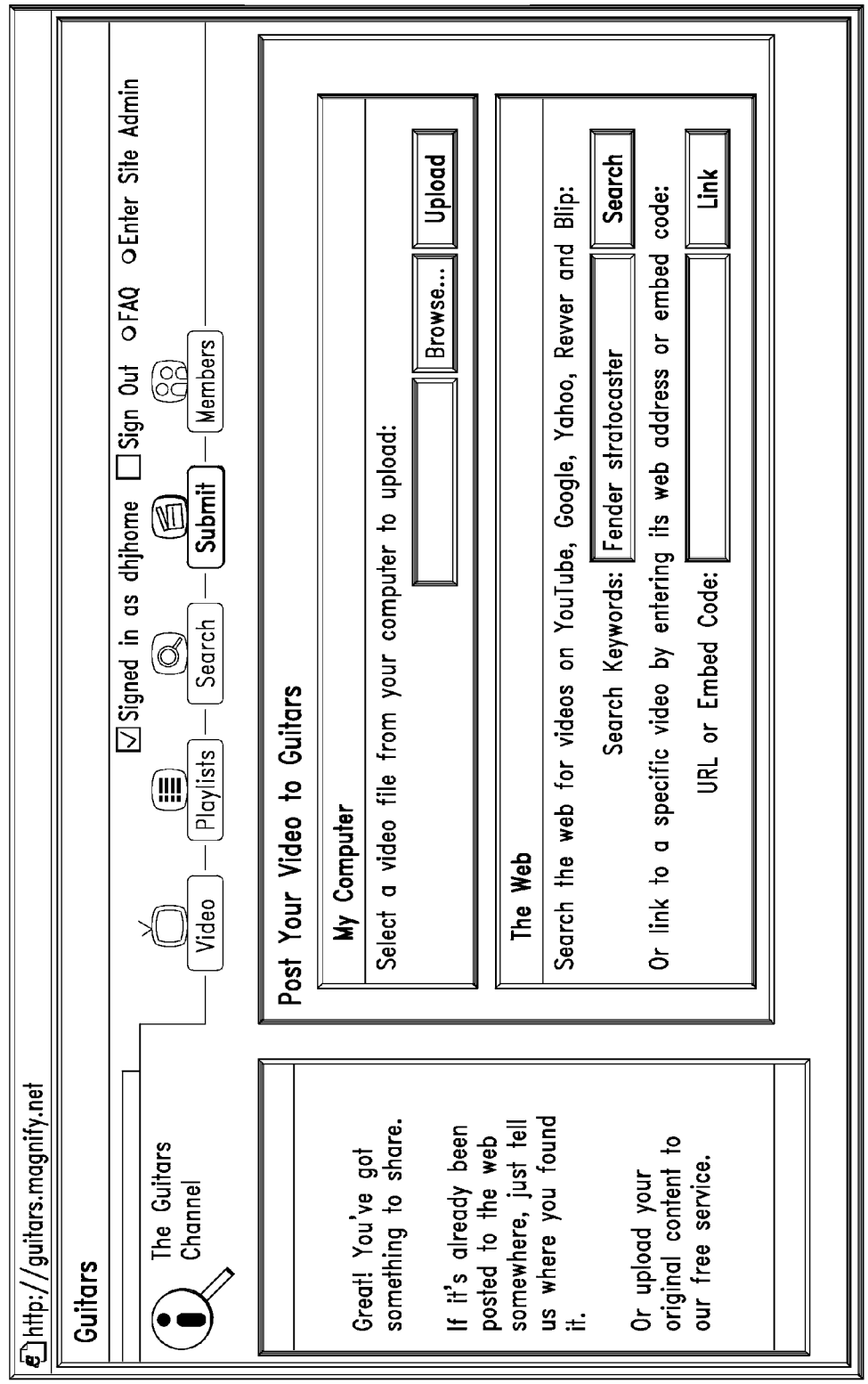
Figure 13:
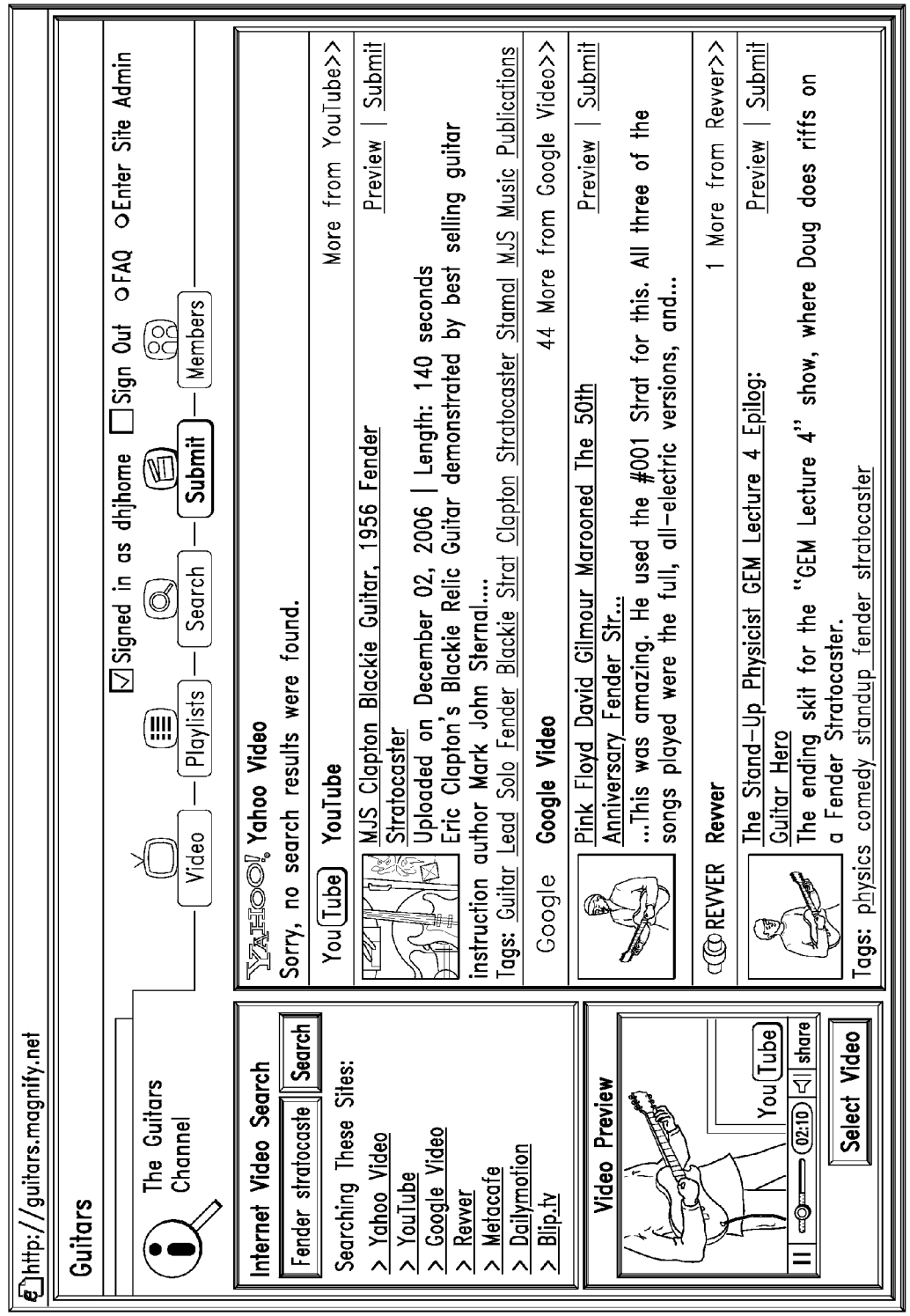
Figure 18:
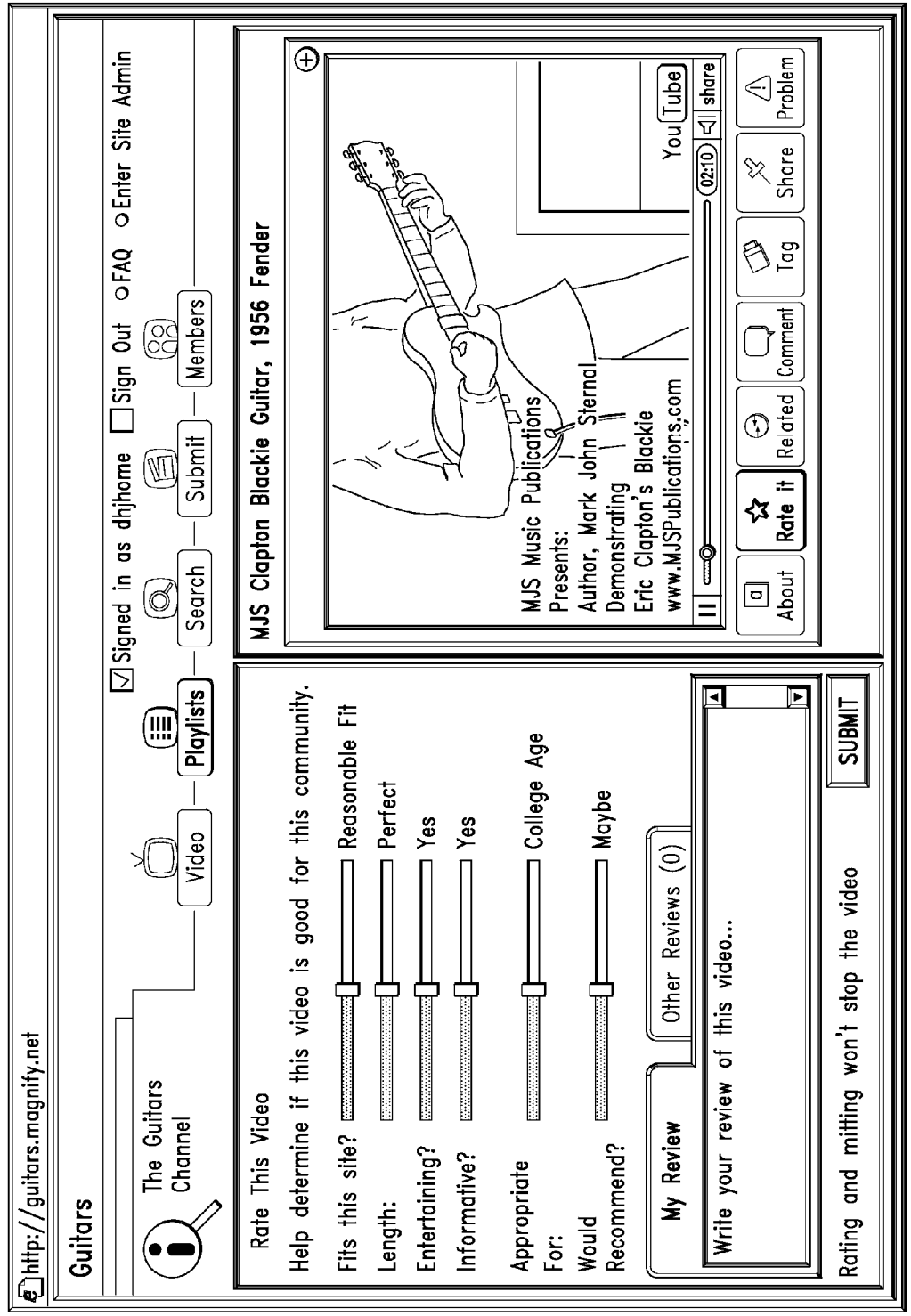
Figure 20:
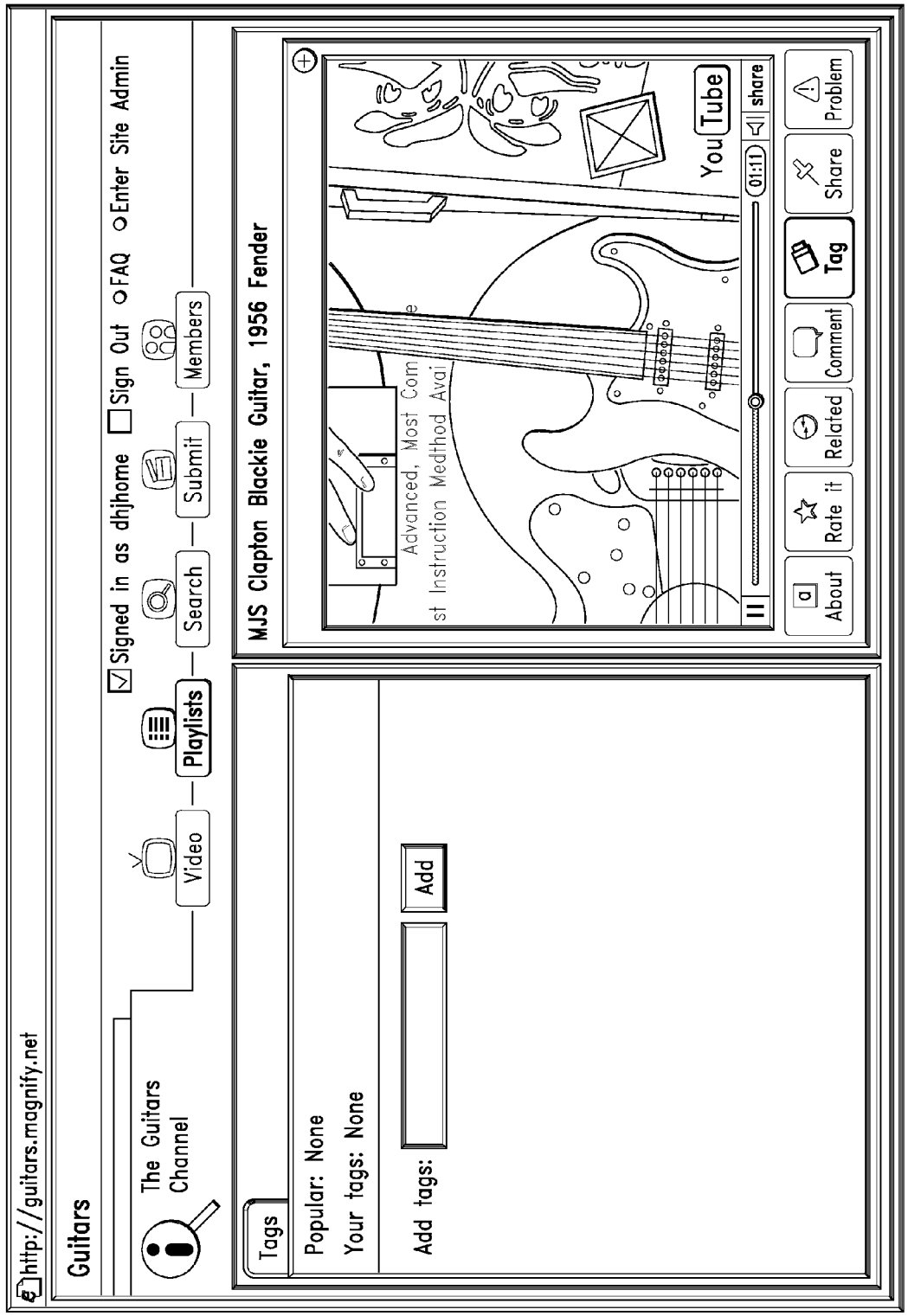

Each of FIGS. 8A-8E illustrates an administrative display by which the user can configure an aspect of the channel;

Figure 9A:
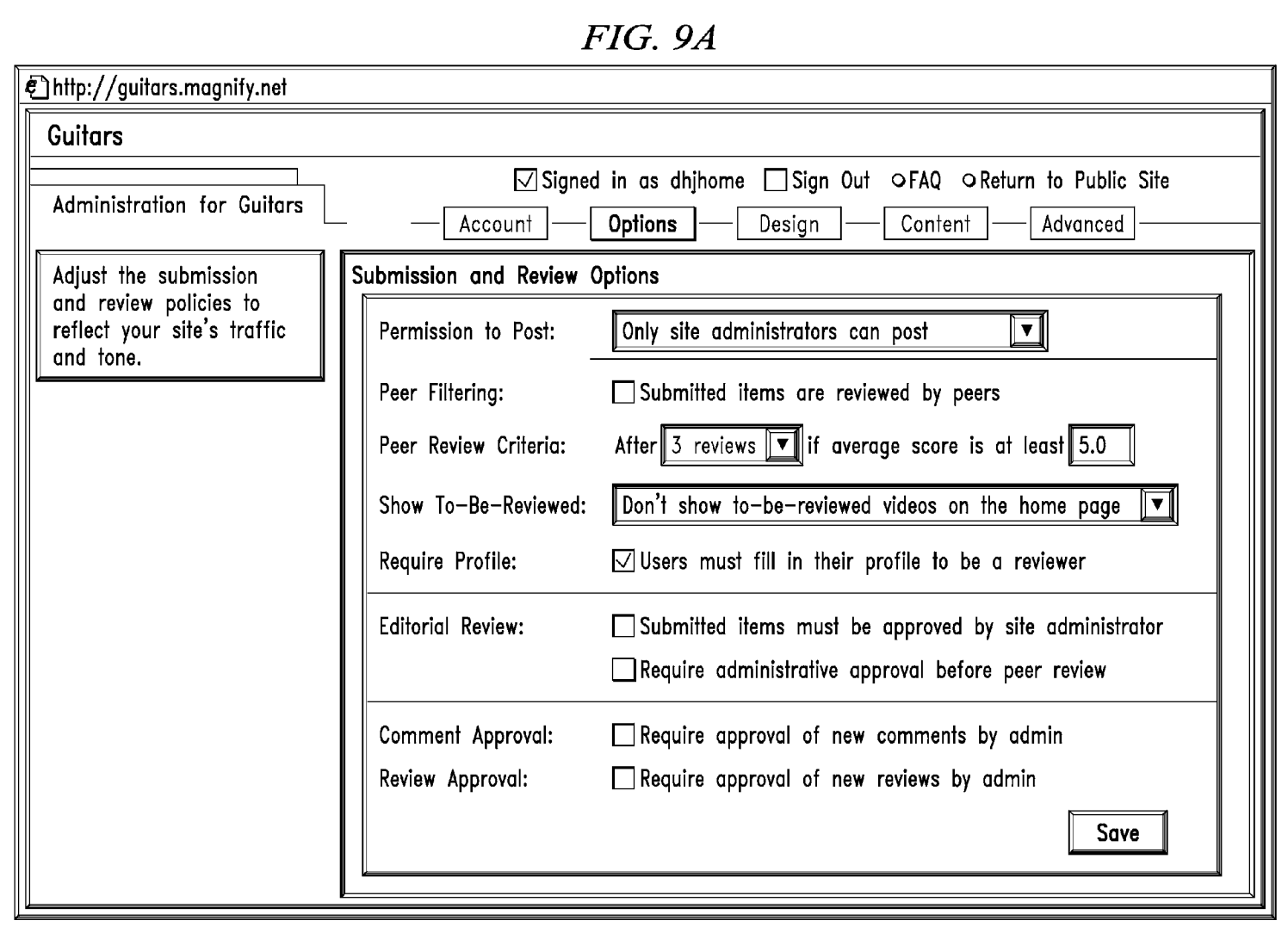

FIGS. 9A-9B show video submission and peer review configuration displays;

FIG. 10 illustrates a channel (site) without any video content;

FIG. 11 illustrates a page from which video content can be searched or otherwise provided to the site;

Figure 12:
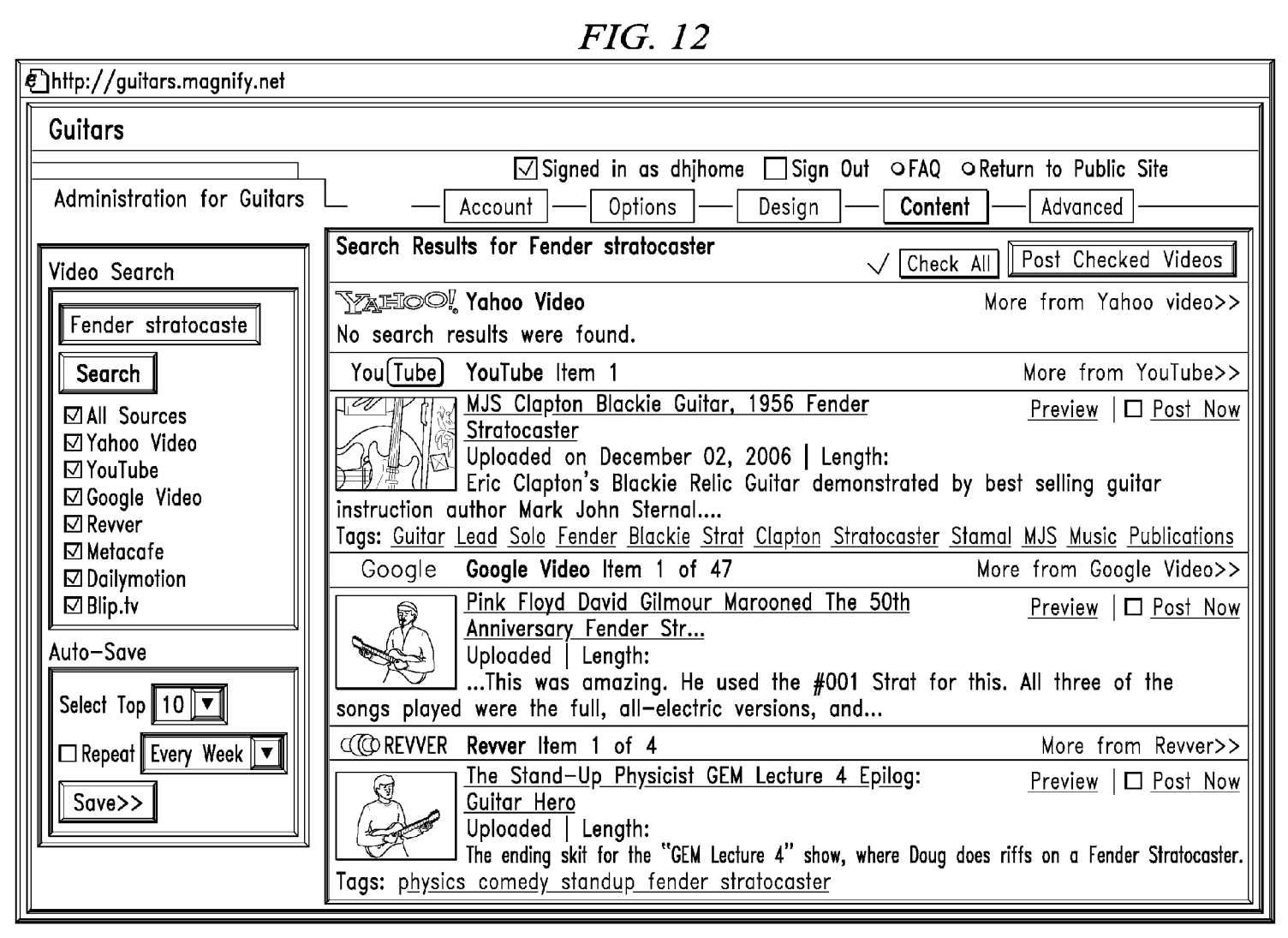

FIG. 12 illustrates a search results page;

FIG. 13 illustrates the search results page following selection of one of the video clips;

Figure 14:
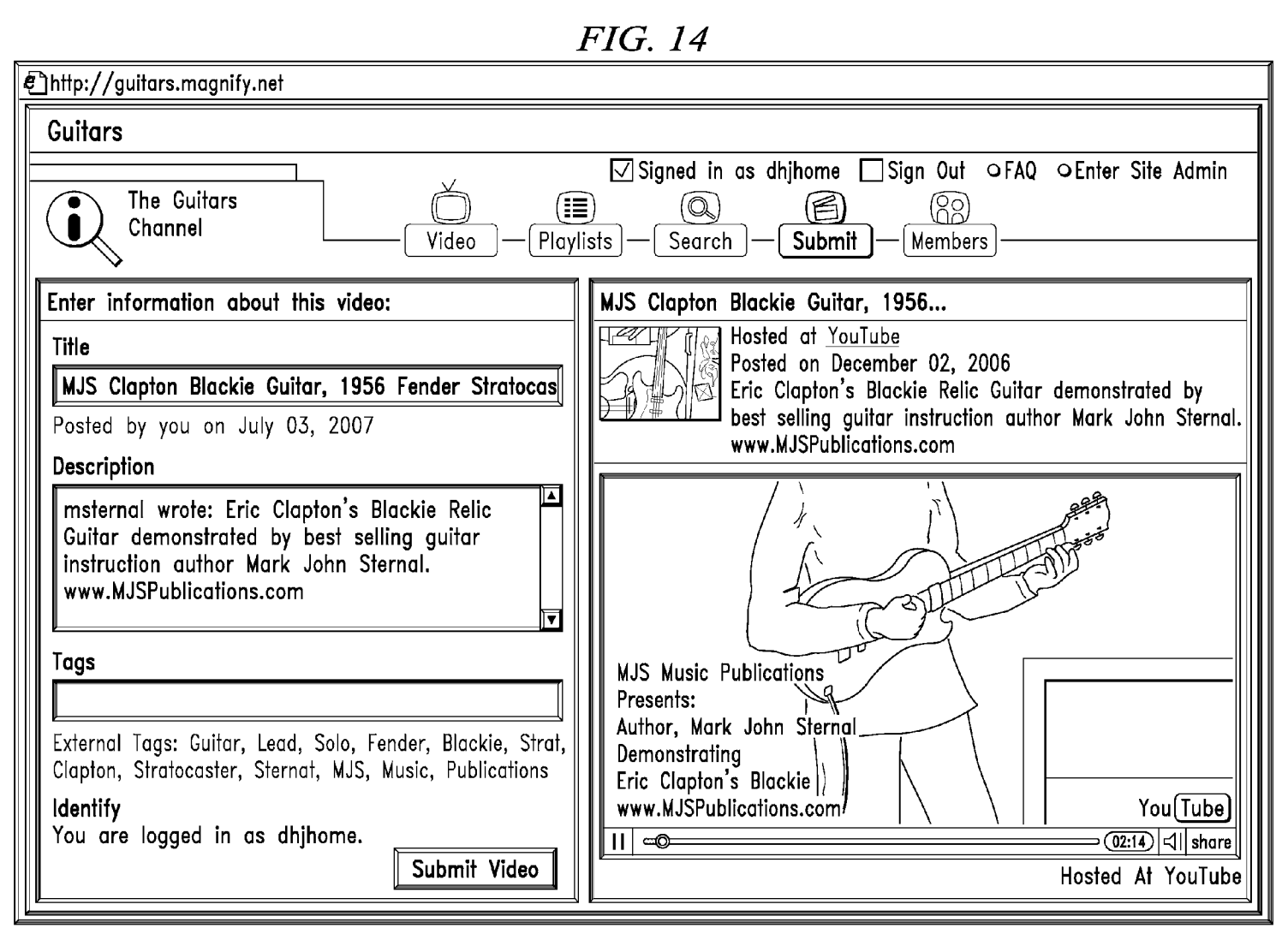

FIG. 14 illustrates the page of FIG. 13 following user selection selection of the video;

Figure 15:
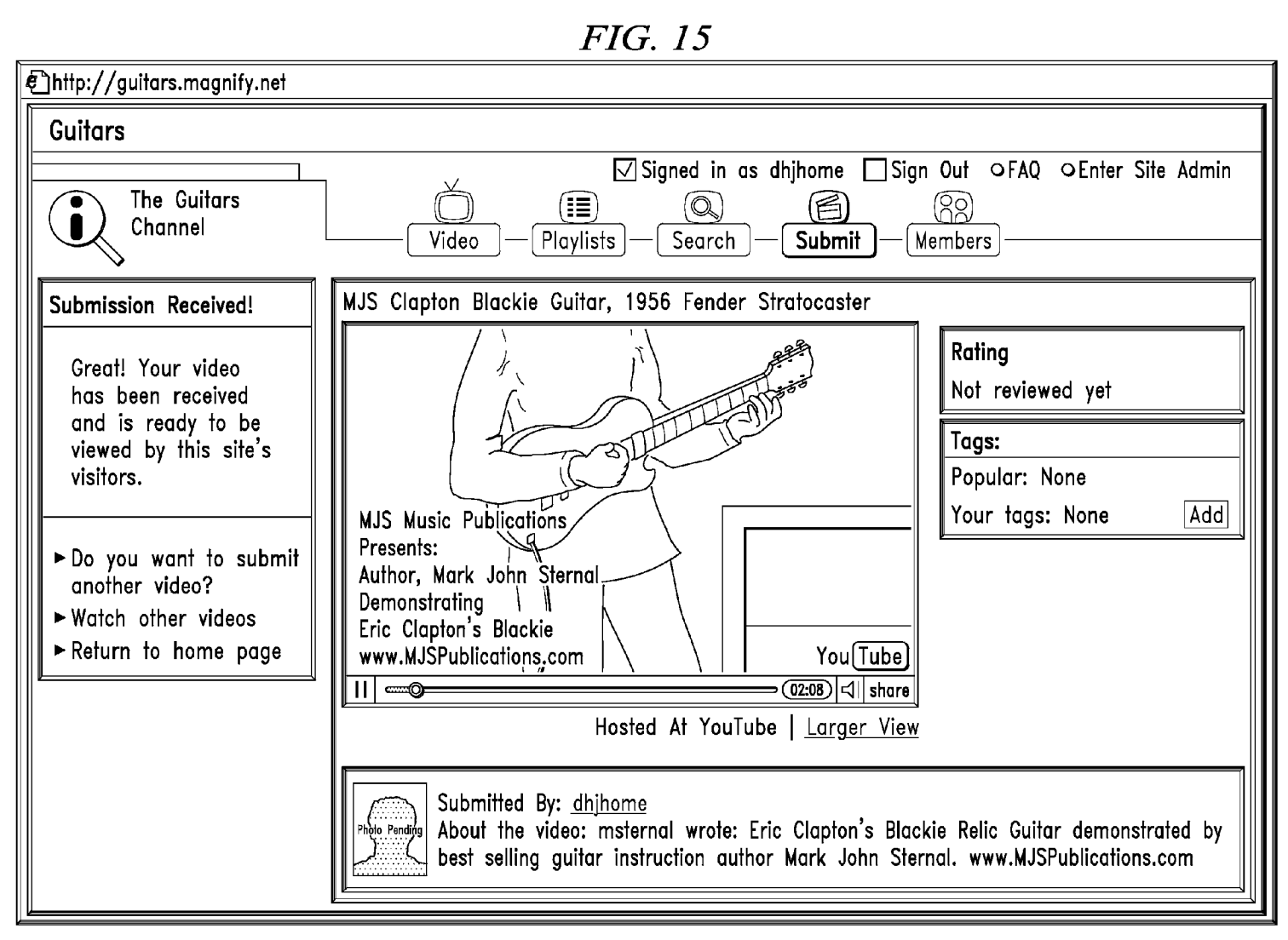

FIG. 15 illustrates a display page following submission of a video for the site;

FIG. 16 illustrates a page by which a user can search and submit multiple video clips at one time;

Figure 17:
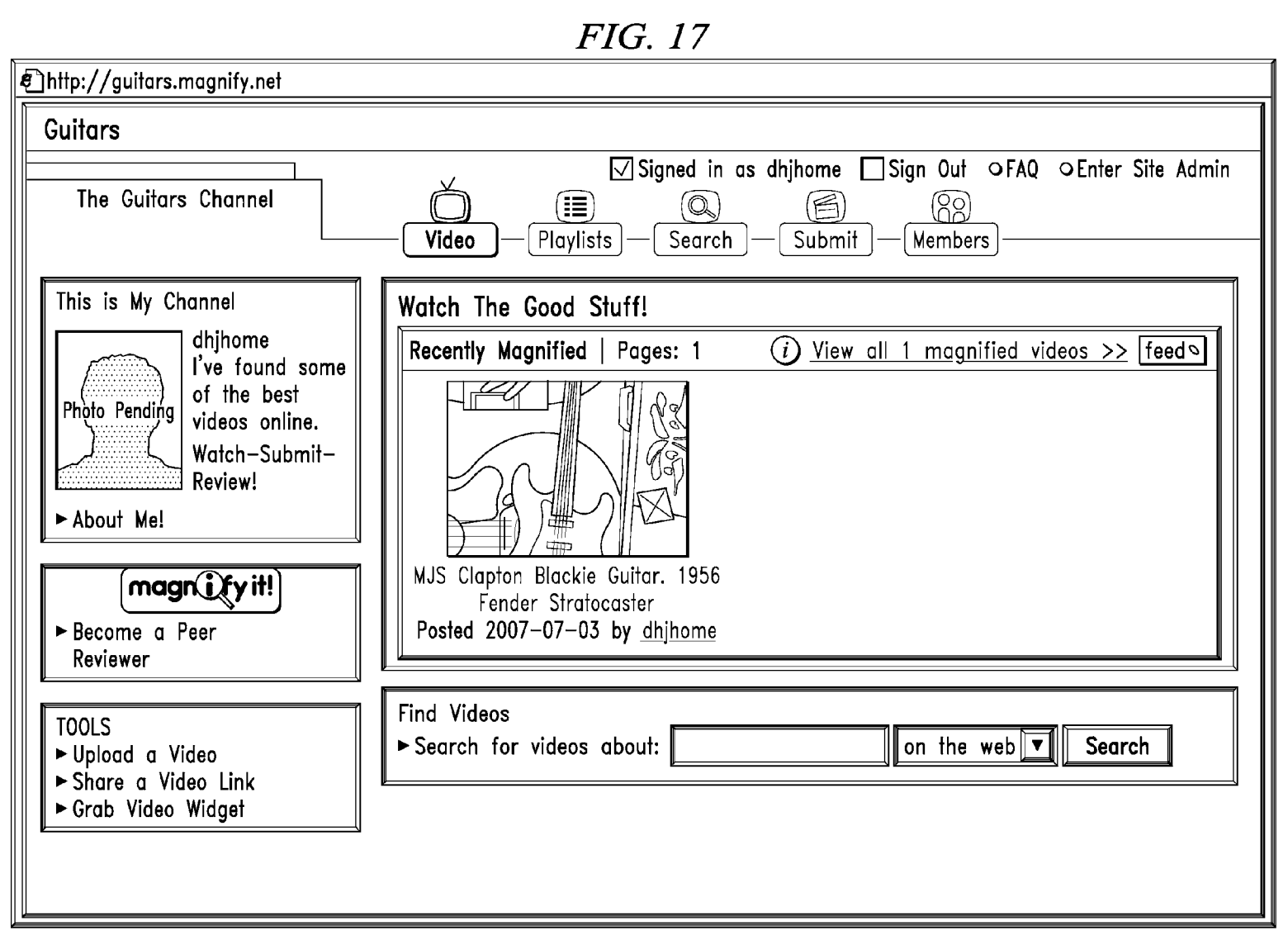

FIG. 17 illustrates the channel with the submitted video clip;

FIG. 18 illustrates how a selected video is displayed in the page, together with a set of rating sliders;

FIG. 19 illustrates the rating slides of FIG. 18 after the user/viewer has rated the video clip;

FIG. 20 illustrates a tag interface for the video display; and

Figure 21:
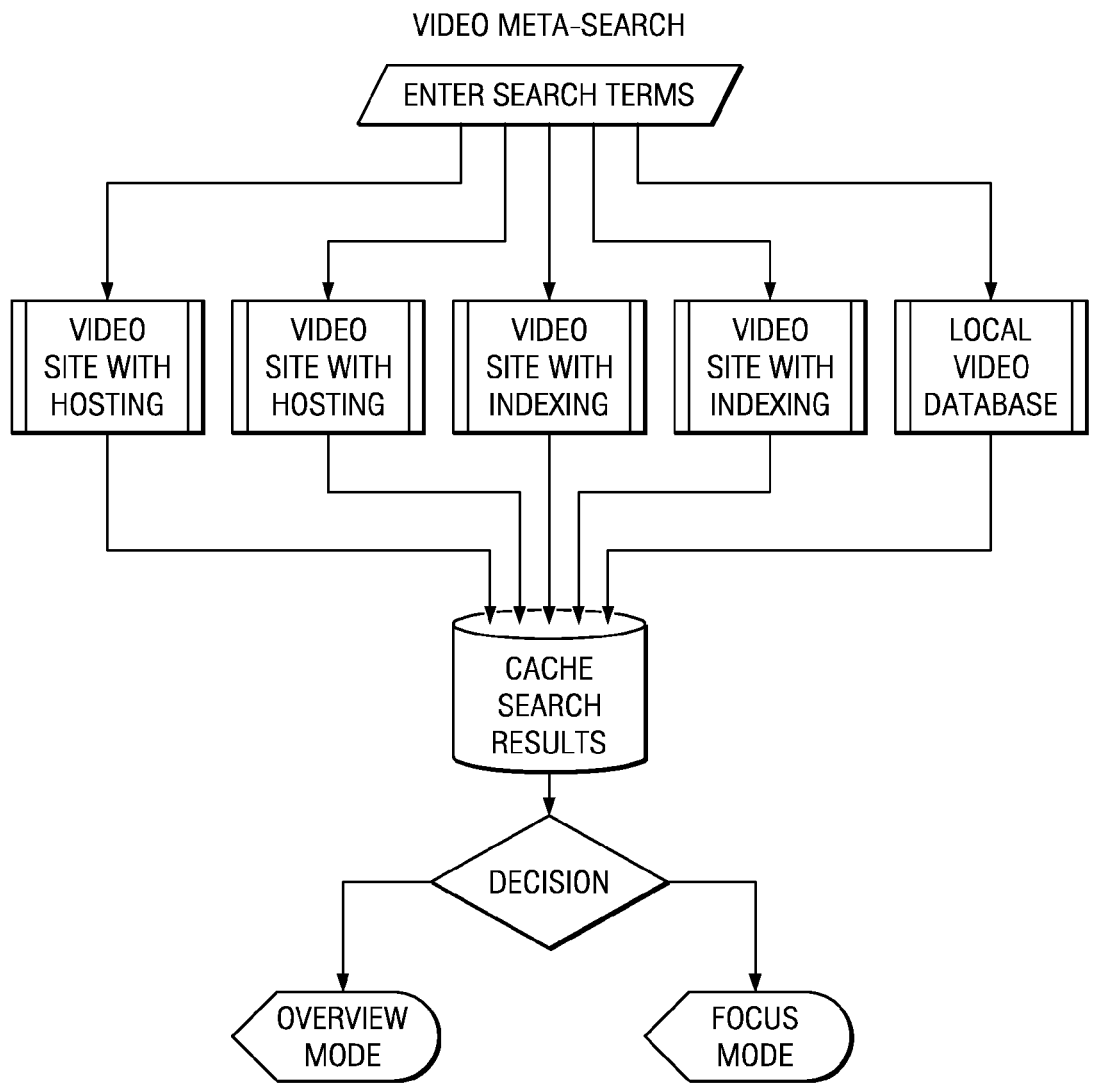

FIG. 21 is a process flow describing the meta-search functionality that is used to retrieve video clips for the channel.

DETAILED DESCRIPTION OF AN ILLUSTRATIVE EMBODIMENT

Figure 1:
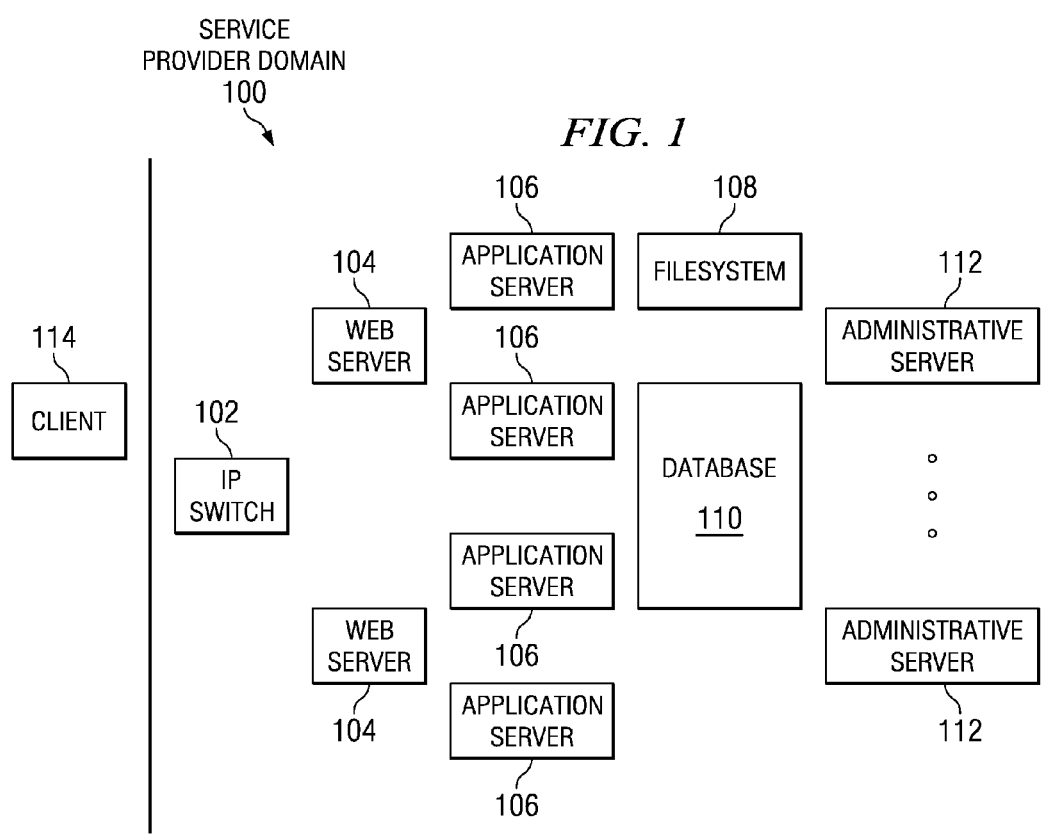
FIG. 1 is a simplified block diagram of a set of system components that provide a hosted system according to the invention.

FIG. 1 illustrates representative system architecture for use in implementing the subject matter described herein. The architecture is implemented in or across one or more Internet accessible data centers as a web site (typically, a set of web pages) together with associated applications running behind the site. End users operate Internet-accessible devices (e.g., desktop computers, notebook computers, Internet-enabled mobile devices, phones or other devices having rendering engines, or the like) that are capable of accessing and interacting with the site. An end user machine has a web browser or other rendering engine that is compatible with AJAX technologies (e.g., XHTML, XML, CSS, DOM, JSON, and the like). An end user accesses the site in the usual manner, i.e., by opening the browser to a URL associated with a service provider domain. The user may authenticate to the site (or some portion thereof) by entry of a username and password. The connection between the end user entity machine and the system may be private (e.g., via SSL). Although connectivity via the publicly-routed Internet is typical, the end user may connect to the system in any manner over any local area, wide area, wireless, wired, private or other dedicated network. As seen in FIG. 1, the "server side" of the system 100 preferably comprises an IP switch 102, a set of web servers 104, a set of application servers 106, a filesystem 108, a database 110, and one or more administrative servers 112. A representative web server is Apache (2.0 or higher) that executes on a commodity machine (e.g., an Intel-based processor running Linux 2.4.x or higher). An application server executes the one or more applications that provide the features of the site, including site creation and customization, video meta-search, content reviewing and filtering, commenting, tagging, playlists, user registration and profiles, affiliate signup, and so forth. The filesystem 108 preferably is an application level distributed system that operates across a number of servers using an HTTP interface. The database 110 may be implemented using MySQL, or any other convenient system. The administrator servers 112 handle other back end processes that are used at the site or otherwise to facilitate the service; these back end processes including, for example, user registration, billing, administration, and interoperability with third party sites and systems as may be required. As also seen in FIG. 1, the system includes client side code 114 that executes natively in the end user's web browser or other rendering engine. Typically, this code is served to the client machine when the end user accesses the site, although in the alternative it may be resident on the client machine persistently.

The system is a multi-tier hosted service that can be customized and managed by the creators of affiliate sites. The client-side interface preferably is based on current web technology standards, including HTML 4 and CSS stylesheets. The web interface is compatible with standard browsers including, without limitation, Internet Explorer on Windows, Firefox on multiple platforms, and Safari on Mac OS X and Windows. Supporting tools include Adobe Flash player and available JavaScript libraries. Client-side interfaces include, without limitation, dynamic web pages with JavaScript for visual effects and AJAX functionality, embeddable widgets developed in Flash and HTML that can be placed on other sites, RSS feeds that provide alternate ways of accessing content, and the like. The server-side application is built on a common software suite that includes Apache, MySQL, and Perl. The server-side application is a generic Linux/Unix/Posix-style environment and is easily portable to other equivalent server platforms. The system also supports H.264 and other encoding protocols.

Figure 2:
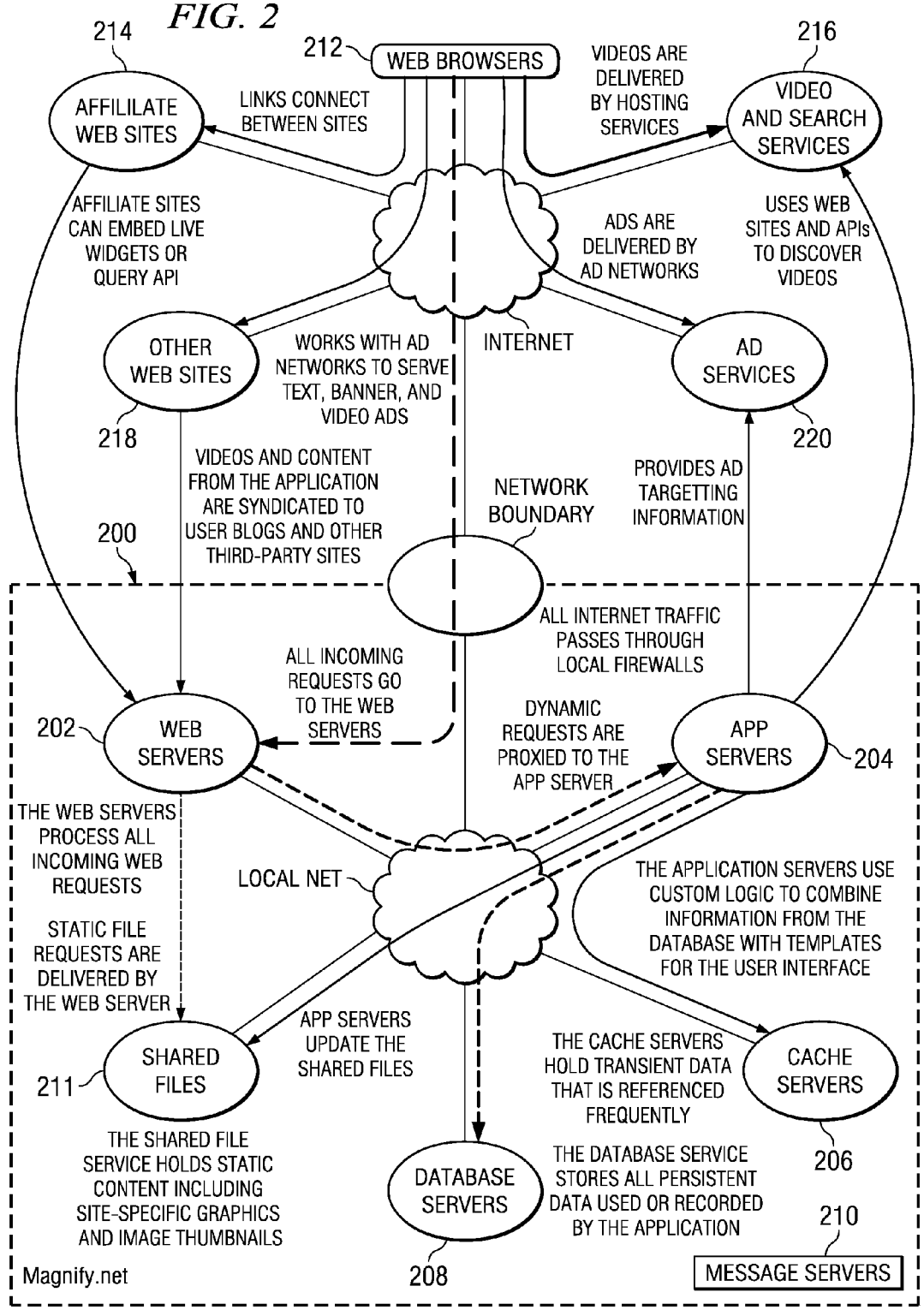
FIG. 2 illustrates how the various functional components of the system interact with one another.

The primary elements of the service architecture and the typical flows of requests between them are represented in FIG. 2. As noted above, the main functional components of the system are implemented at an Internet-accessible system site 200, which is this case is reached by opening a browser to the domain magnify.net (this domain is merely representative, and it is a service mark of the assignee of this application). As can be seen, the server-side functionality is partitioned into several tiers as follows: a web server tier 202, which delivers static files and act as a load balancing proxy for the application servers; an application server tier 204, which combines dynamic page templates with custom logic and functionality; a caching server tier 206, which provides a shared repository for short-term storage of frequently used data; a database server tier 208, which stores, searches and updates all persistent information within the system; and a messaging server tier 210, which sends automatic notifications and accepts content from email or mobile SMS. A shared file service 211 holds static content including site-specific graphics and image thumbnails. The application server also interacts with other Internet services in a variety of ways: video hosting (post, retrieve and embed video content from third-party hosting services); advertising networks (retrieve and embed targeted advertising from third-party ad servers); and affiliated sites (XML APIs enable integration with other sites operated by affiliates).

End-users, site creators and others access the system through web browsers 212. Site channels (as will be described) typically are associated with an affiliate's primary or "home" web site, and these sites are identified by reference numeral 214. As indicated, affiliate sites can embed live widgets or query the system's API. As will be described in more detail below, the system discovers, annotates and embeds video content from multiple video and search services, which services are indicated by reference numeral 216. The system uses web sites and APIs to discover videos from such services. If desired, videos and content from the application may be syndicated to user blogs and other third party sites 218. The system also interoperates with advertising services and networks 220 to serve text, banner and video advertisements. The system components illustrated in FIG. 2 are a representative embodiment; it is not required that all such components be included, or that the identified boundaries be as shown. One of more components may be combined or associated with the system or other entities, as the case may be, without departing from the scope of the described subject matter. It is not required that the components be located within the same data center. As will be seen, the site preferably comprises a set of machines that execute a set of processes. A function may be implemented in a distributed manner, e.g., across a set of Intel processor (or equivalent)-based Linux (or equivalent)-based server machines that are connected in a local area network, or in any other convenient manner.

Figure 3:
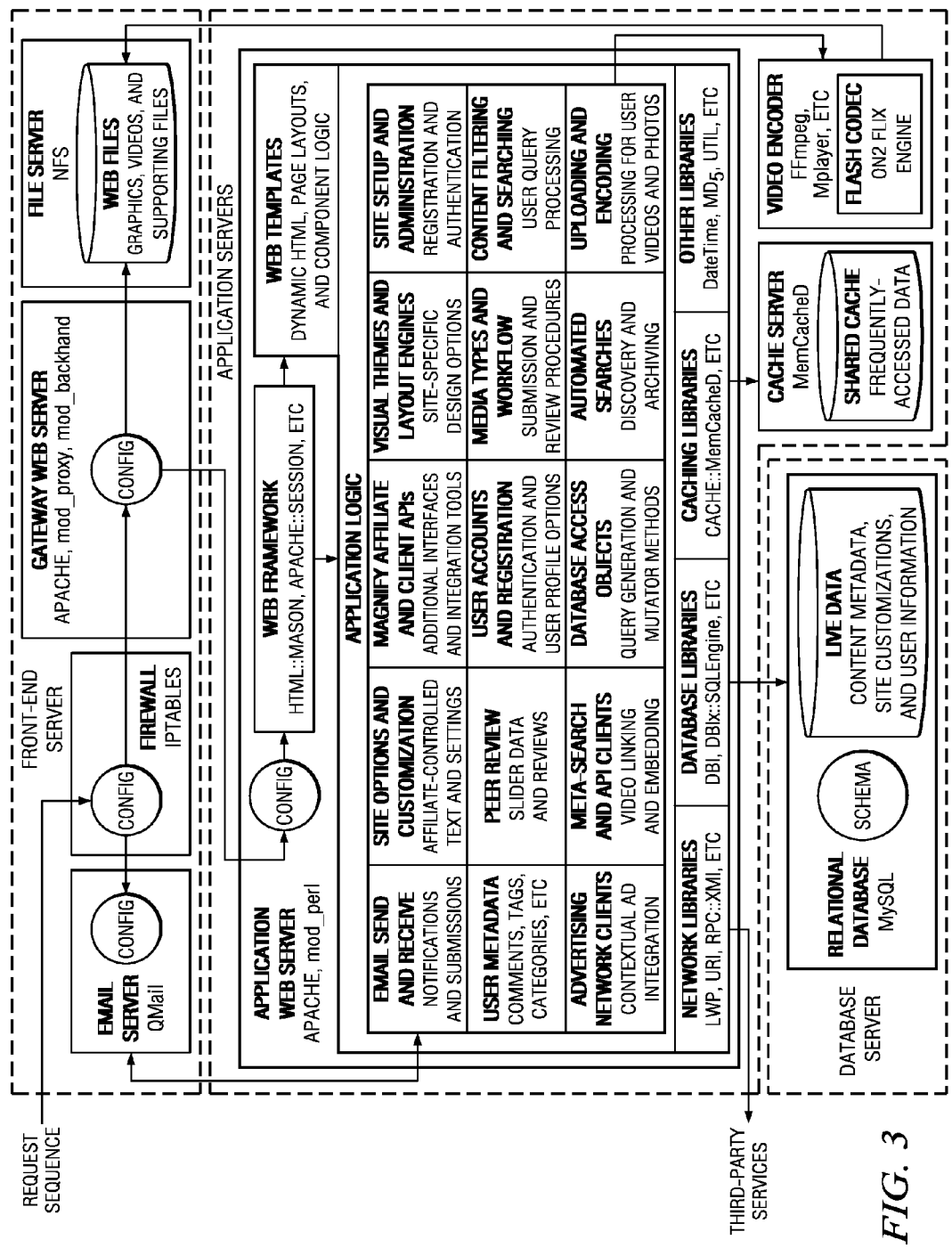
FIG. 3 illustrates a more detailed block diagram of the server-side components of the video discovery and publishing platform of the invention.

FIG. 3 illustrates the primary modules of the server-side and how these modules interrelate to one another. As can be seen, the application logic comprises a number of functional components that will now be described in the context of a typical user interaction with the system. During such interaction, various displays are exported to the user's web browser, and these displays are described and illustrated below.

Generally, the system provides any Internet user with the ability to quickly set up and customize a video channel, preferably as a web page or site that can be reached from any Internet-accessible device having a web browser. The solution includes tools for use by channel site creators to customize the look, feel, and page design. A particular web page or site may be associated with a given subject. As used herein, a page or site that has such an association is sometimes referred to as "subject-specific." Although not meant to be limiting, once a subject-specific channel is created, a site administrator or individual visitors can search across the web and choose to bring those search results into the channel architecture. The system also enables a multiplatform search as an integrated part of a library build; if desired, search results are automatically populated into the channel content. The system also enables the characterization of the material returned, preferably according to a user-generated taxonomy. In one embodiment, the taxonomy may be developed from a collaborative filtering review that extends beyond the search characteristics. The system thus facilitate the process of discovery and organization within a vertical channel of online video content, drawing in videos from all over the Internet, and collecting them in new topical contexts, where they can be annotated by members of a social network, online community, or other group with a shared interests.

Preferably, the system provides links to or embedded players for content that is hosted on multiple third-party web sites. Web browsers then display these independently-hosted videos in the context of the system's web pages. It is not required that the system copy, host, or serve those embedded videos, which typically are delivered by third parties under their own terms and licenses.

Figure 6:
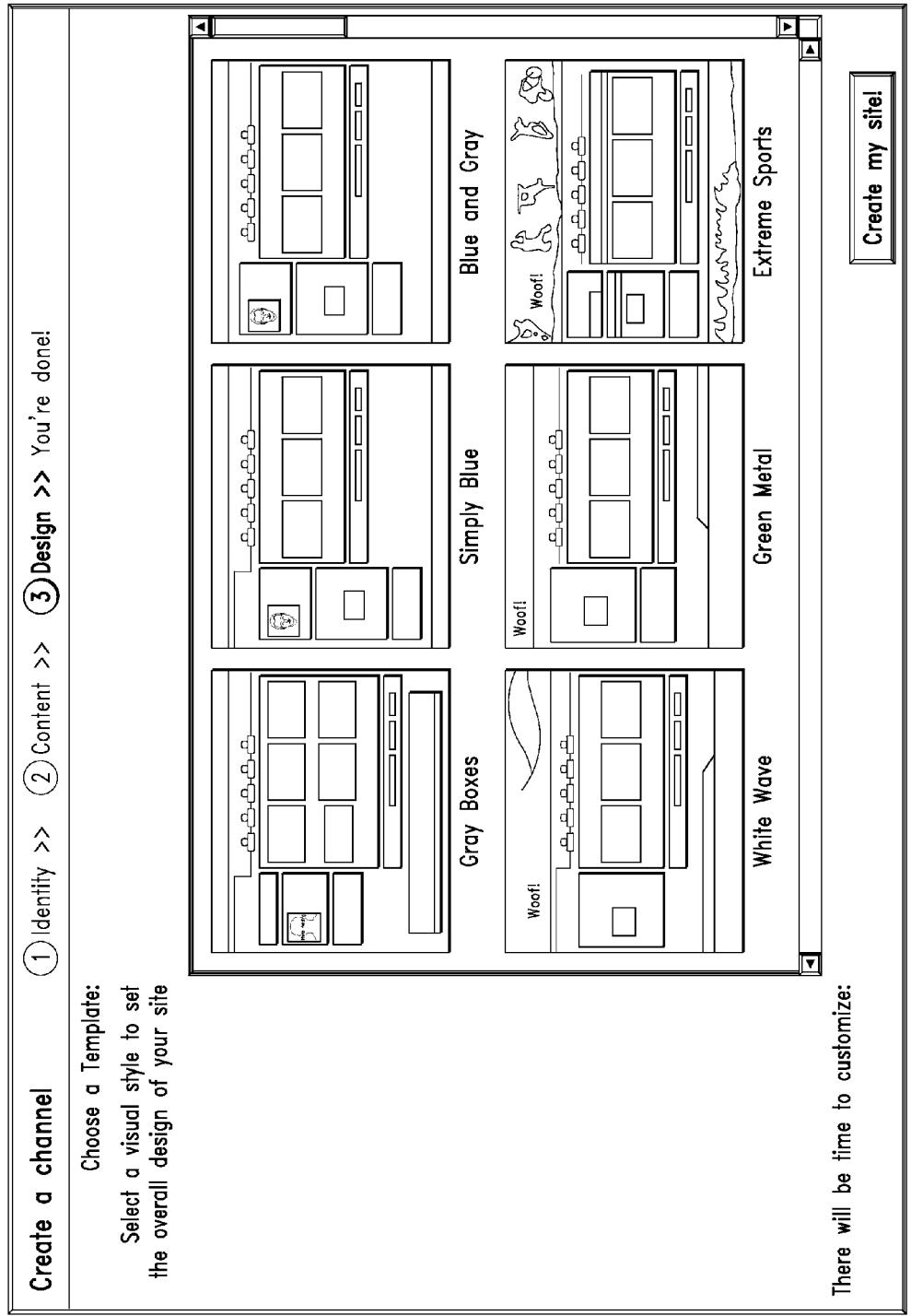
FIG. 6 illustrates a site template page by which a user can select a predefined channel template.

A typical user interaction with the system begins with channel creation. As noted above, in a typical use scenario an end user operating a client machine navigates to the site's home page via a web browser. In this embodiment, a site creator (an individual, an entity, or the like) is directed to a web site where they are given the tools to create a channel name and to select a user name and password, and are provided with site design and layout tools. FIG. 4 illustrates a typical user interface at which the channel selection process begins. Using this interface, the user can name the channel and link to an existing site. Selecting the Next button navigates the user to the user interface of FIG. 5. In this interface, the user can identify the channel and associated keywords, select a content category (via the dropdown list selections), determine whether to allow others to post videos on the site (via the dropdown list selections), indicate (via the radio buttons) whether the channel will be public, unlisted or private, and select a channel listing identifier that can be uploaded from the user's machine. Once the desired information is input in the form fields, the user selects the Next button and is navigated to the user interface of FIG. 6. At this point, the user can select from a set of one or more pre-configured site templates. Of course, if desired the system may present a site configuration tool to enable the end user to create a custom look and feel for the site. Upon selection of a site template, the user selects the "Create my site!" button to complete the channel creation process.

Figure 7:
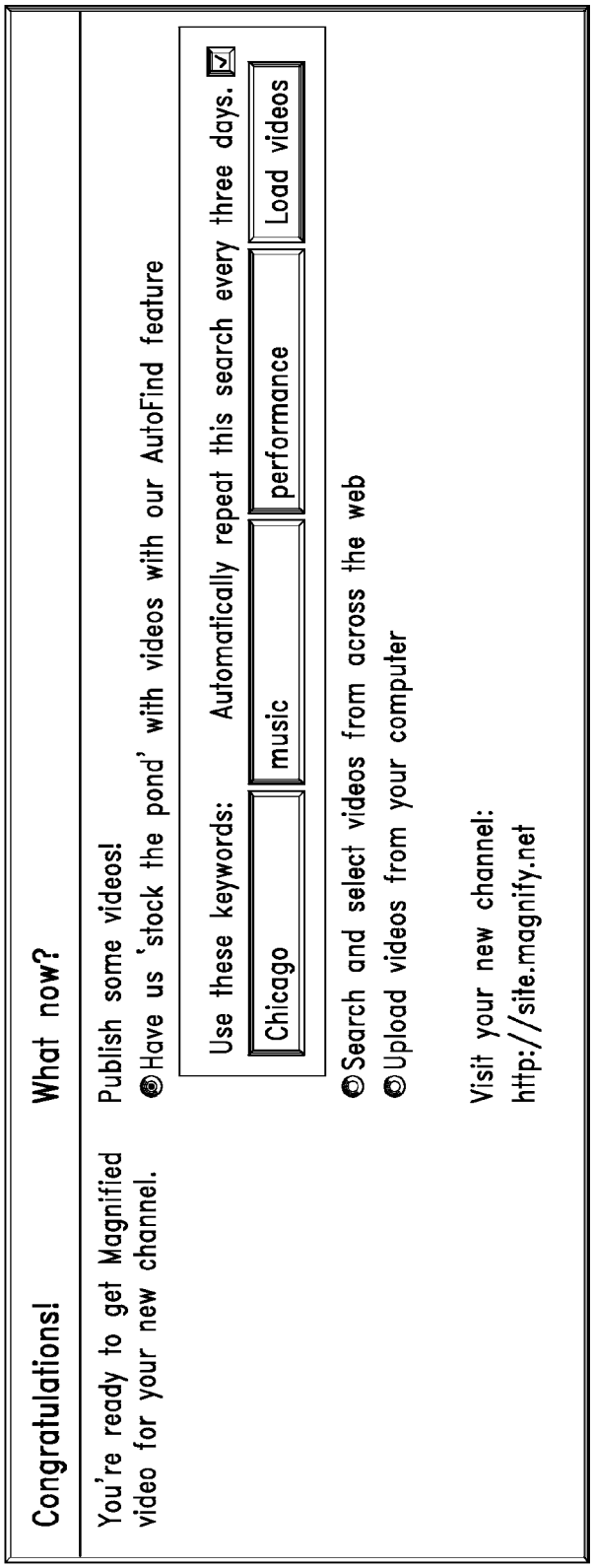
FIG. 7 illustrates a registration notice page displayed to the user upon completion of the channel creation process.

FIG. 7 illustrates a resulting notification page from which the user can manage the channel. By selecting a radio button, the user can request the system to automatically find videos from third party sites that match the keywords identified by the user. This search can be repeated periodically if the user indicates in a check box (or other UI widget). Alternatively, the user can select a radio button that enables the user to search and select videos from across the web (instead of having the system perform the meta-search). In another option, the user can upload videos from his or her computer by selecting that option. The page also indicates the user's site, which in this embodiment includes the channel's name, indicated as a subdomain (e.g., site.magnify.net) of the hosted video discovery and publishing service.

Figure 8A:
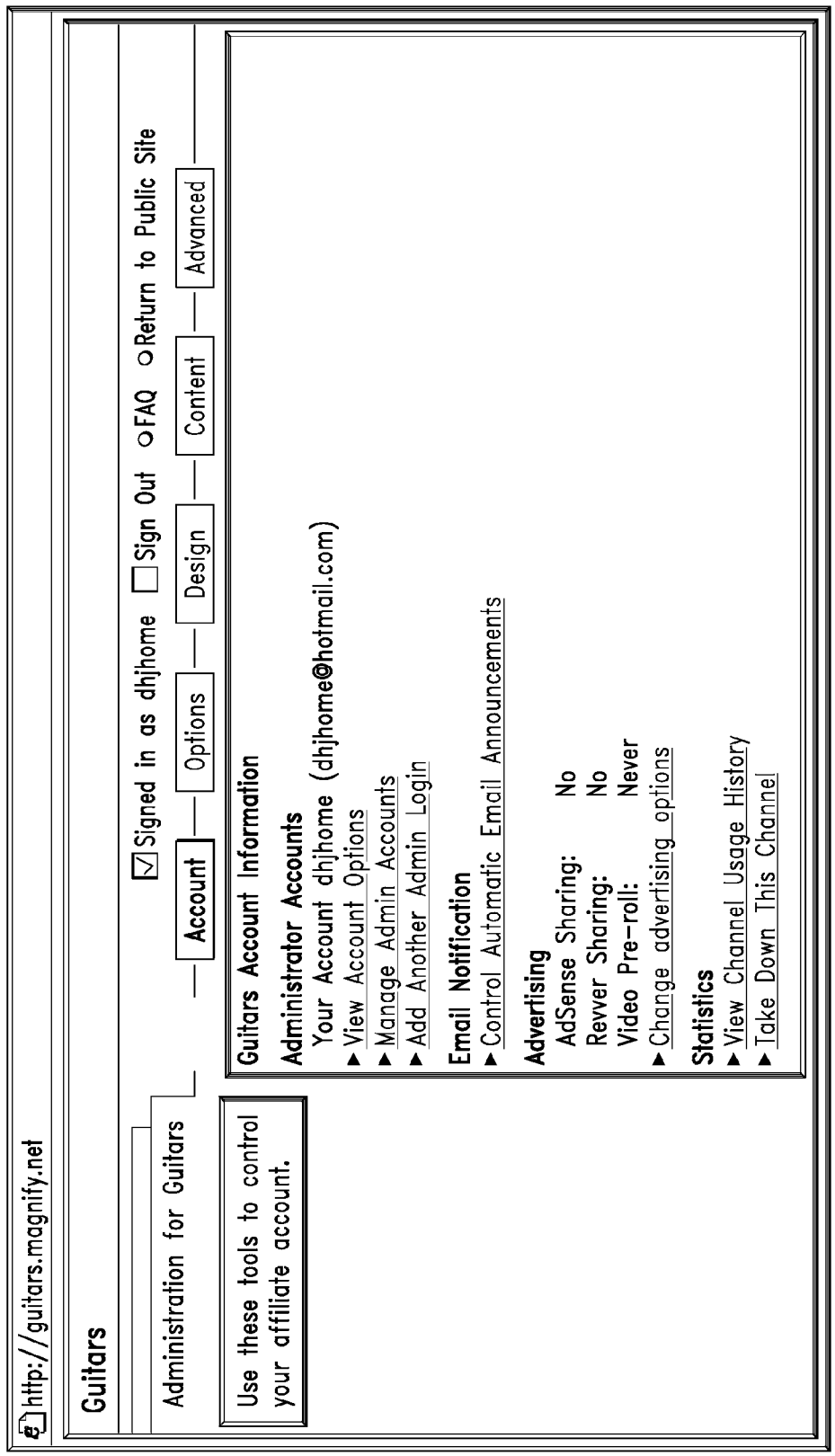
Figure 8C:
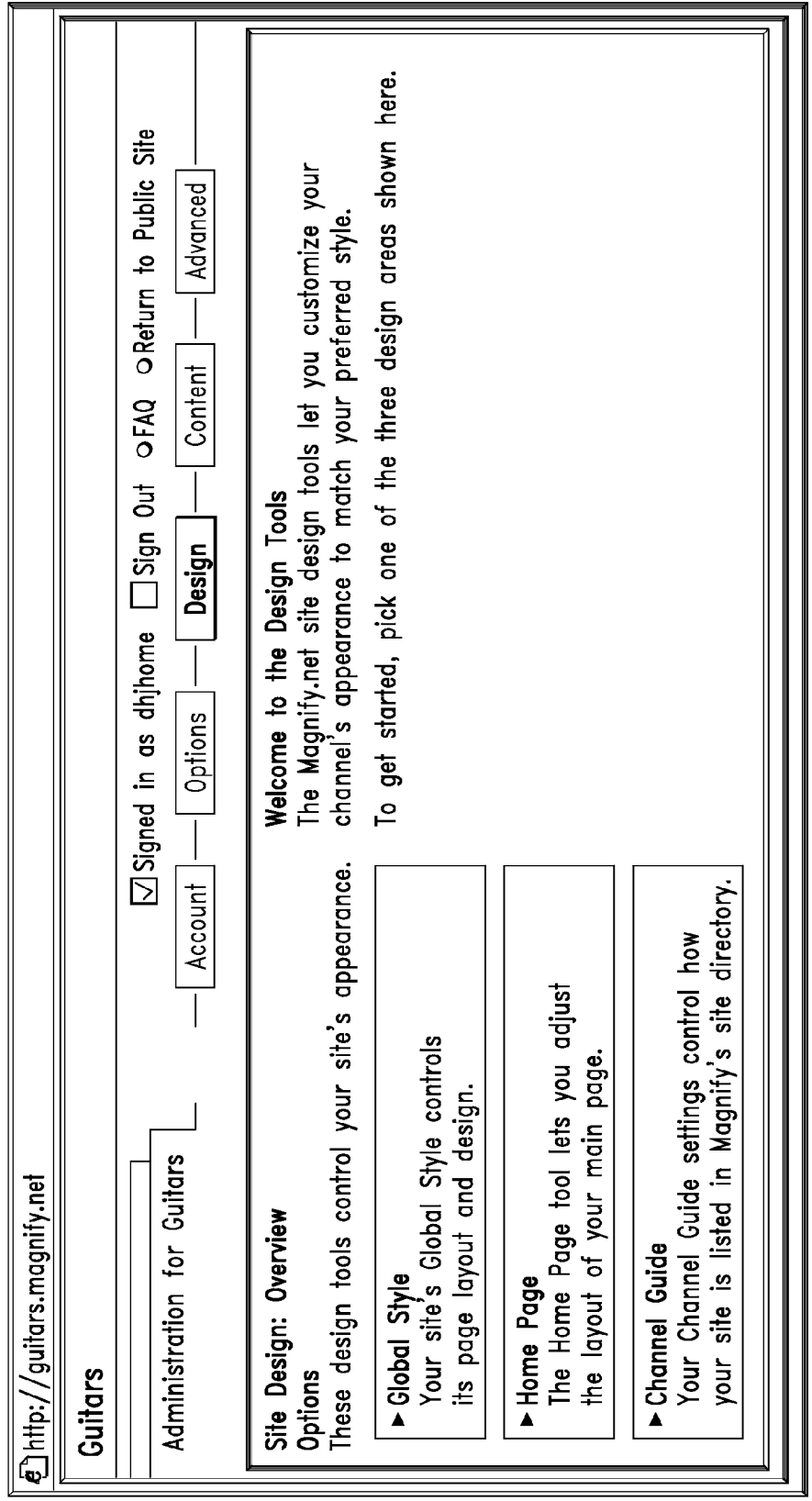
Figure 8D:
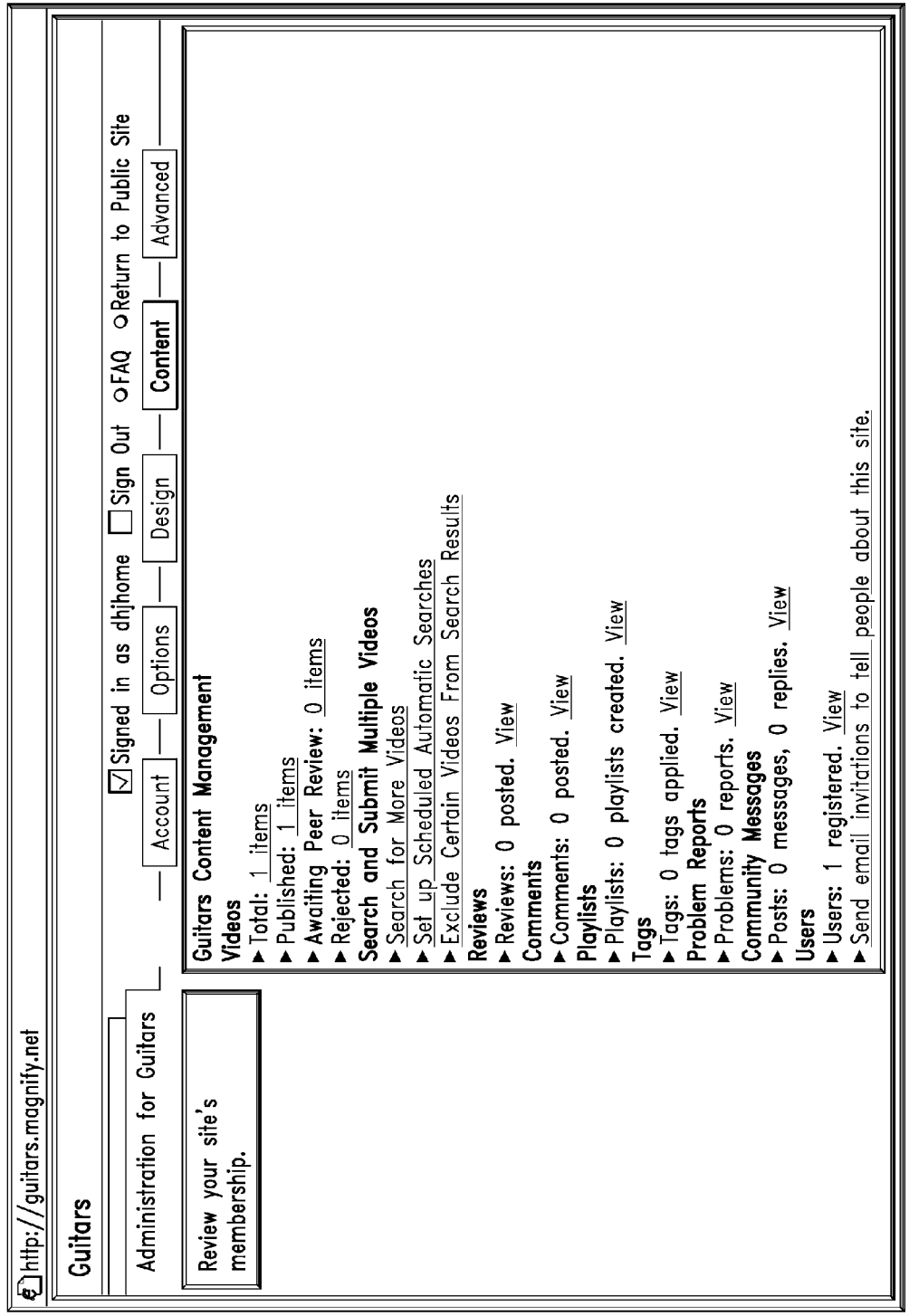
Figure 8E:
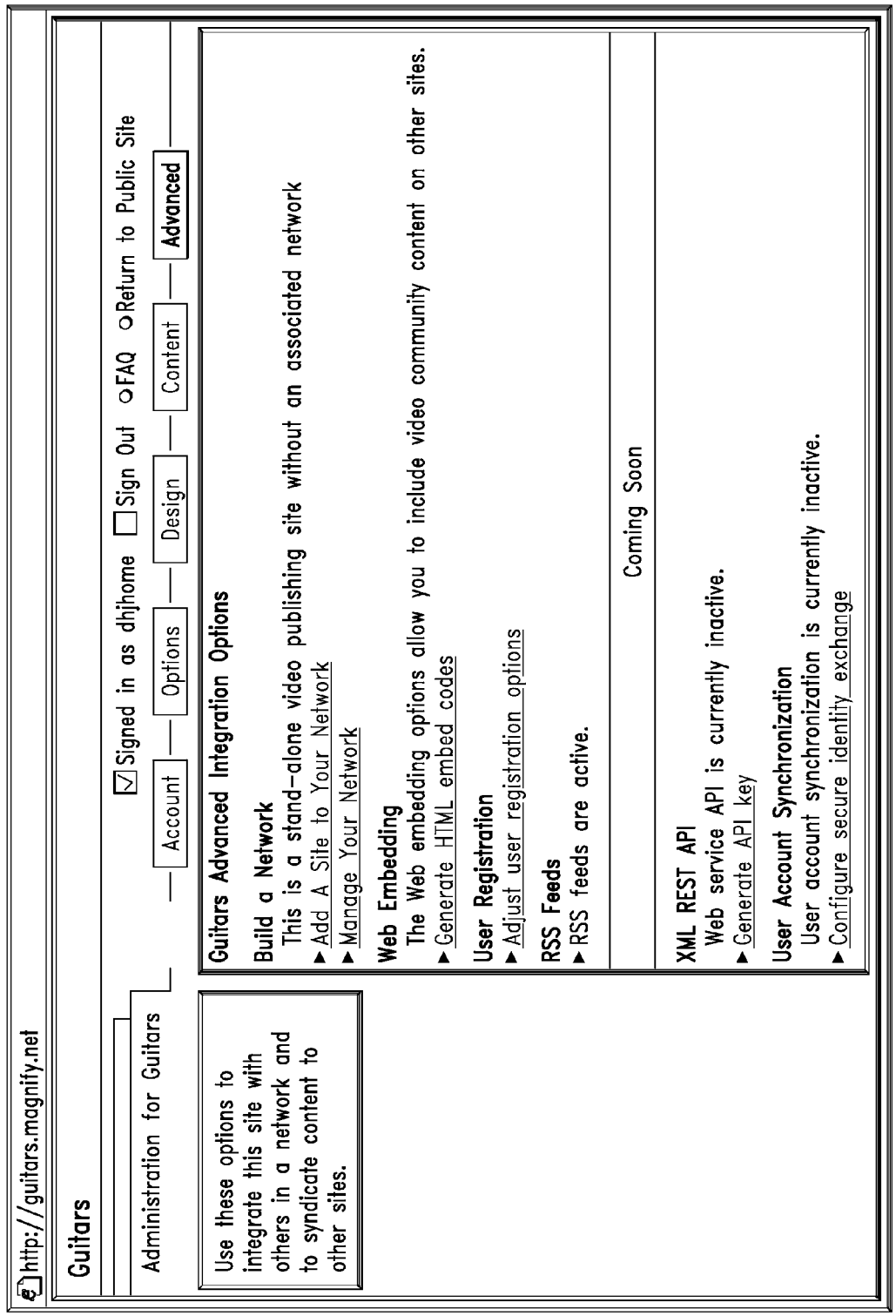

The system may provide a number of site administration tools. A channel called "guitars" has been created by the channel creation process described above and is available at the site guitars.magnify.net. FIG. 8A is a representative page by which the user can manage account information for this site. This includes setting up and managing administrators, enabling email or other invitations, setting advertising (revenue sharing) options, and providing access to site statistics. FIG. 8B is a representative page by which the user can customize the site's options and configuration including: site name and web address, site description, whether and to what extent community interaction with the site will be permitted, video submission and peer review policies for the site, as well as formats and playback options. The video submission and peer review policies identify whether the site creator intends to allow third parties to submit videos to the channel and/or to permit third parties to peer review the videos on the channel. FIG. 9A illustrates a screen by which the user can identify specific video and peer review options for the site, and FIG. 9B illustrates a screen by which the user can configure rating descriptors and options if peer review is enabled for the site. FIG. 8C is a representative page by which the user can change the design of the site. FIG. 8D is a representative page by which the user can manage the site's content. FIG. 8E is a page by which the user can establish and manage advanced configuration options including: building multiple sites into a network and managing that network, embedding video community content on other sites, adjusting user registration options, and others.

FIG. 10 illustrates a representative site that does not yet include any videos. By selecting the Submit, the user is navigated to a Submit page, such as shown in FIG. 11. From this page (or other pages), the user can upload videos from his or her computer, search identified third party web sites, or link to a specific video. In this example, the user has typed "Fender Stratocaster" in the fill-in field and selected the Search button. This action causes the system to perform a meta-search on one or more third party sites to locate relevant video content associated with the search criteria. FIG. 12 illustrates a representative search results page. This search results page provides several options. If the user selects a Preview link, the video is displayed in a preview pane, such as shown in FIG. 13. From this page, the user can click on "Select Video," which action opens up the page shown in FIG. 14. From this page the user can enter additional information about the video including descriptive text, comments, site-specific metadata tags, and the like. As this point the user may decide to submit the video to the channel. This can be accomplished by selecting the "Submit Video" link; the same action can be accomplished by selecting the "Submit" link in FIG. 13. FIG. 15 illustrates the page that results from the submission.

The submission process just described and illustrated is not meant to be limiting. The system preferably also provides automated tools to facilitate the video discovery and submission process. FIG. 16 illustrates a representative display page for this purpose. Using this page, the user can find existing video clips by entering keywords in a search field and requesting the system to issue a search of one or more third party sites. This automatic find feature performs a meta-search across the identified sites. The page also enables the user to either show the search results (so that the user can select which videos should be included in the site), or to automatically post a configurable number of discovered videos from each identified search source. Using the illustrated page controls, the user can then direct the system to automatically repeat this auto-find and posting process every configurable number of days and to group results according to one or more identified meta-tags. Using the other illustrated controls, the page also enables the user to exclude certain videos from the search results, and to upload videos from the user's own computer or other identified source.

Videos submitted to the channel (whether manually or through an automated process) are available for viewing and peer review, as is now described. FIG. 17 illustrates a sample page comprising the site, which page now includes the video (that has been located as a result of the meta-search) and submitted via the submission process described in FIGS. 11-15 above. Of course, if the auto-find feature (of FIG. 16) was selected and the user had selected to post a configurable number of clips, there would be more videos available for display. In any case, assume now that a viewer (whether the creator, or any third party that has access to the site) selects the video (e.g., by clicking on the image). This action causes the video to be played in a player, such as shown in FIG. 18. The player preferably includes a set of one or more controls including About, Rate It, Related, Comment, Tag, Share and Problem. In this example, the Rate It button has been selected. This action results in a set of user-configurable sliders to be presented to the viewer. Using the sliders, the viewer then can provide a review of the display content, e.g., based on one or more user- or system-defined attributes. These attributes can be defined and configured using the submission and peer review options, such as illustrated above in FIGS. 9A-9B. FIG. 19 illustrates the ratings panel that has been manipulated by the user to rate the video he or she is viewing or has viewed. The system preferably collects data from multiple viewers and then uses the information (in the aggregate) to fine tune advertising on the site, and to provide advertisers and ad networks with better metadata concerning, for example, user-generated video content. Typically, the aggregated ratings information for a given video on the site (or a set of videos) is posted on the site. If a particular video receives poor ratings, the video may be deleted from the site, either manually or per an automatic setting that the administrator can establish.

FIG. 20 illustrates the display when the user selects the Tag button. This option enables the viewer to enter viewer-specific tags if the site creator/administrator has permitted this option. The Related control displays a form by which the viewer can see related videos, the Comment control displays a form by which the viewer can enter comments or other descriptive material, and the Share control enables the viewer to share the video, e.g., by sending the video to another via email or SMS, by linking to video, by including the video in a blog, by creating a playlist that includes the video, or the like. The Problem control enables the viewer to report a problem with the video and/or its display.

FIG. 21 illustrates the meta-search function as a process flow. As noted above, the channel creator and visitors to the channel site can enter search terms, which the system then sends as queries to one or more web services. Although not required, preferably the system sends the search queries to multiple kinds of video search engines, including sites that directly host and deliver video from their own servers as well as sites that index videos hosted on other servers. As is known, video clips are typically searched using meta-tags or other descriptive information about the video content. Such information typically is created by the video creator or other publisher and is assumed to be available in a computer-readable format (e.g., such as XML). As indicated in FIG. 21, the system receives the responses from the various search queries using known techniques, e.g., XML or object-notation web APIs (using REST or RPC protocols), retrieving one or more RSS feeds, or the like. In the alternative, the system performs the meta-search by automated direct web access to public video search pages, with use of text pattern recognition to identify and parse the search results returned. The system may also include the results of queries of one or more local databases containing references to videos that have been discovered previously, or that have been submitted directly to the system. As illustrated, the system then caches the results of the search queries to obviate repeated requests to the outside search engines. (Of course, the system may include its own search engine or video discovery functionality). Once the results are obtained, users can navigate between an overview mode, which shows results from multiple search engines, and a focused mode, which shows only a specified engine's results. The index information (e.g., the URLs) associated with the videos discovered through external search queries may be stored in a local database system for future retrieval and annotation. Finally, the system may make additional follow-up API or web services requests to gather extended metadata regarding a selected video found through a search engine.

As described and illustrated above, users may perform a search and then choose videos found on external search engines to be included in the local video channel. References to selected videos, preferably along with associated metadata retrieved from the search engine and any additional follow-up queries, preferably are saved in a local database and associated with the video channel through which they were selected. In addition, and as described above with respect to FIG. 16, users can perform a search and request that links to a certain number of matching videos be imported into the channel all at once. Preferably, the system asks site creators for relevant search terms during the site creation process, and with their approval can quickly import a collection of related videos into the channel by searching on each of those search terms. Videos and associated metadata that have been linked to a given channel preferably are displayed on that channel's web site. Videos hosted on third-party sites that have been discovered and linked to by users of the site preferably are played through an embedded window in a channel-specific page of metadata. Videos that cannot be played through an embedded window can be linked to instead of being shown directly. Moreover, as also shown in FIG. 16, an auto-discover/auto-publish feature allows for a calendar based tool that searches, discovers and posts a configurable number of videos every configurable number of days. This allows the site content to remain fresh and relevant.

As also described above, the channel web site allows the site's creator (and visitors) to associate additional comments and other metadata with a particular video clip. Over time, preferably the system builds up a set of descriptive metadata about the videos referenced on each site including, for example, the local comments, reviews, ratings, and tags entered by that channel's users.

The system also enables site users to manage a structured set of tags, including the ability to organize tags into categories, define synonyms for tags, and suggest replacements. Preferably, the system presents user- or system-configured candidate tags that a user or viewer may then choose to apply to a particular video if desired. In addition, the system's search interface may present user- or system-defined tags as search tags that a user or viewer may then choose to use as search criteria. If desired, the system can present the suggested candidate tags or search tags in several ways, including by popularity or according to the tag structure and relationships that have been defined for that site. Moreover, the system may present sets of mutually exclusive candidate tags (e.g., as a slider or equivalent single-choice mechanism to indicate mutual exclusivity) so that a user can choose to tag a clip according to the different tag attributes. In addition, preferably each channel site maintains its own distinct collection of tags applied by users to videos including, for example, both system-managed tags and other user-entered tags. In this regard, the system pre-defines some tags with widespread applicability and enables the site administrator to provide local aliases, so that a site creator can rename tags while maintaining the same taxonomy structure.

The channel web site allows the site's creator and visitors to perform searches on the local database of both discovered video metadata, and site-specific contextual metadata. Preferably, the system can integrate or compare metadata about a video from multiple sites that reference the video. Moreover, preferably the system performs searches for videos using integrated metadata, e.g., from multiple sites, although this is not a requirement as a search may be directed to a single site. Where meta-searching is performed on integrated metadata, preferably the system groups or associates videos based on commonalities in the integrated metadata. If desired, the system can make recommendations to individual users for videos or channel sites based on the integrated metadata.

The system can use a channel ranking algorithm to facilitate discovery of channels from the primary site. That algorithm may rank channels based on various factors, such as total visitors, total new members, site owner, types of user interaction, and other sorting and selection criteria. The channels can be subscribed to via RSS (or other means) and therefore can be made available on computers, mobile devices, and home television receivers (such as Tivo, Apple TV and other IPTV-enabled devices connected to the public Web via IP or other protocols.

As can be seen in FIG. 10, preferably the site includes one or more third party-sourced advertisements that are related in some way with the site content. There is no requirement that advertisements be displayed from the site of course.

Although not shown in detail, a user can use its own domain name as the URL of the channel.

The system provides a managed or hosted service that is scalable and highly reliable. Multiple users create video channels, which are web pages (or sites). (A web site is a set of one or more pages). After creating and customizing a channel site, the site creator can list the site in a public directory of video channels (or maintain the site private) and can send electronic mail messages inviting people to visit the site. The channel site is associated with one or more DNS host names associated with the system. Using a search tool, the creator (or others having permission) cause the system to meta-search and then populate the channel with video content. Web users who visit a web address associated with the system receive a customized web interface that contains channel content and metadata, and that allows for various user interactions such as viewing, rating, comment, upload, sharing, playlist creation, video communities, and revenue sharing. The system provides an infrastructure by which a large number of sites that are looking to become part of an online ecosystem (but that do not have the technology or focus on video required) to reach a larger audience. By enabling videos to be identified and classified according to (preferably user-configurable) site-specific categories, the system enables aggregated audiences for content that might otherwise not even be seen.

Of course, although not described in detail, one of ordinary skill in the art will appreciate that the inventive system may interact with one or more e-commerce, ad-serving, payment, promotion, and distribution systems as required. One of more of such components may be performed natively, or through web-based or other interaction with third party systems.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The invention can take the form of an entirely hardware embodiment, an entirely software embodiment, or an embodiment containing both hardware and software elements. In one preferred embodiment, the initial layout and reflow algorithms are implemented in software executing in one or more server machines. The invention (or portions thereof) may take the form of a computer program product accessible from a computer-usable or computer-readable medium providing program code for use by or in connection with a computer or any instruction execution system. A computer-usable or computer readable medium can be any device or apparatus that can include, store or communicate the program for use by or in connection with the instruction execution system, apparatus, or device. The medium can be an electronic, magnetic, optical, or the like. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

As noted above, preferably the client-side interface is dynamic and affords end users with significant creative control over how videos are displayed and integrated to create their customized channels. Although not required, the interface is conveniently enabled using AJAX (Asynchronous JavaScript and XML), which are a known set of web development techniques that enhance the web page's interactivity, speed and usability.

While the system has been described in the context of video and video clip discovery and publishing, this is not a limitation of the invention. The techniques of the invention may be used for photos, graphics, music, software, or other content.

While given components of the system have been described separately, one of ordinary skill will appreciate that some of the functions may be combined or shared in given instructions, program sequences, code portions, and the like.

The invention claimed is:

1. A content channel curating, hosting and display method, operating in a computer network, comprising:

displaying, using a server supported on at least one hardware element, a set of one or more pages, the one or more pages comprising a site template from which a content channel may be defined, a first interface portion that provides a calendar-based tool for defining a content discovery policy for the content channel, and a second interface portion that provides a configuration tool for defining a submission and review policy for the content channel;

receiving, from a first entity, first configuration data to define a first content channel using the site template, a first content discovery policy for the first content channel, and a first submission and review policy for the first content channel;

receiving, from a second entity distinct from the first entity, second configuration data to define a second content channel using the site template, a second content discovery policy for the second content channel, and a second submission and review policy for the second content channel;

for each respective content channel, and as defined by their respective first and second content discovery policy, performing a search across network resources to locate content;

for each respective content channel, embedding at least some of the content located by the search in the respective content channel;

for each respective content channel, and provided that the submission and review policy for that content channel is satisfied, including in that content channel additional content;

displaying each of the first and second content channels as a distinct page; and for at least the first content channel, and as defined by the first discovery policy for the first content channel, repeating the search, and posting into the first content channel a configurable number of content elements every configurable number of days as defined by the first configuration data.

2. The method as described in claim 1 wherein the respective content channel is associated with a user-selected subject.

3. The method as described in claim 1 wherein the content is one of: video, photographs, graphics, music, software, and other Internet-accessible content.

4. The method as described in claim 1 further including receiving an indication that controls access to the content channel.

5. The method as described in claim 4 wherein the access is one of: public, unlisted and private.

6. The method as described in claim 1 wherein the custom submission and review policy including at least one peer review option submission.

7. The method as described in claim 1 wherein the first interface portion enables the respective first or second entity to define one of: keyword-based search criteria, to identify a set of one or more target sites to be searched for content, to define a search results display policy, and to establish a discovery update frequency.

8. The method as described in claim 1 wherein the search is a meta-search.

9. The method as described in claim 1 further including receiving rating information associated with a given piece of content.

10. Apparatus, comprising:
a processor, and
a non-transitory computer-readable storage medium, the computer-readable storage medium having computer program instructions executed by the processor to perform a method for curating, hosting and displaying content channels, the method comprising:
displaying a set of one or more pages, the one or more pages comprising a site template from which a content channel may be defined, a first interface portion that provides a calendar-based tool for defining a content discovery policy for the content channel, and a second interface portion that provides a configuration tool for defining a submission and review policy for the content channel;
receiving, from a first entity, first configuration data to define a first content channel using the site template, a first content discovery policy for the first content channel, and a first submission and review policy for the first content channel;
receiving, from a second entity distinct from the first entity, second configuration data to define a second content channel using the site template, a second content discovery policy for the second content channel, and a second submission and review policy for the second content channel;
for each respective content channel, and as defined by their respective first and second content discovery policy, performing a search across network resources to locate content;
for each respective content channel, embedding at least some of the content located by the search in the respective content channel;

for each respective content channel, and provided that the submission and review policy for that content channel is satisfied, including in that content channel additional content;
displaying each of the first and second content channels as a distinct page; and
for at least the first content channel, and as defined by the first discovery policy for the first content channel, repeating the search, and posting into the first content channel a configurable number of content elements every configurable number of days as defined by the first configuration data.

11. A content curation system, comprising:
an Internet-accessible infrastructure operating at a service provider domain, the Internet-accessible infrastructure comprising:
a set of one or more web servers;
a set of one or more application servers; and
a database;
the Internet-accessible infrastructure comprising at least one hardware element and operative to perform a method for curating, hosting and displaying content channels, the method comprising:
displaying a set of one or more pages, the one or more pages comprising a site template from which a content channel may be defined, a first interface portion that provides a calendar-based tool for defining a content discovery policy for the content channel, and a second interface portion that provides a configuration tool for defining a submission and review policy for the content channel;
receiving, from a first entity, first configuration data to define a first content channel using the site template, a first content discovery policy for the first content channel, and a first submission and review policy for the first content channel;
receiving, from a second entity distinct from the first entity, second configuration data to define a second content channel using the site template, a second content discovery policy for the second content channel, and a second submission and review policy for the second content channel;
for each respective content channel, and as defined by their respective first and second content discovery policy, performing a search across network resources to locate content;
for each respective content channel, embedding at least some of the content located by the search in the respective content channel;
for each respective content channel, and provided that the submission and review policy for that content channel is satisfied, including in that content channel additional content;
displaying each of the first and second content channels as a distinct page; and
for at least the first content channel, and as defined by the first discovery policy for the first content channel, repeating the search, and posting into the first content channel a configurable number of content elements every configurable number of days as defined by the first configuration data.

* * * * *